United States Patent
Qing et al.

(10) Patent No.: US 7,430,911 B2
(45) Date of Patent: Oct. 7, 2008

(54) METHOD OF DETECTING AND ANALYZING CHANGES IN THE EXTERNAL LOADING CONDITIONS OF A STRUCTURE

(75) Inventors: Xinlin Qing, Cupertino, CA (US); Chang Zhang, Santa Clara, CA (US); Irene Li, Stanford, CA (US)

(73) Assignee: Acellent Technologies, Inc., Sunnyvale, CA (US)

( * ) Notice: Subject to any disclaimer, the term of this patent is extended or adjusted under 35 U.S.C. 154(b) by 2 days.

(21) Appl. No.: 10/928,788

(22) Filed: Aug. 26, 2004

(65) Prior Publication Data

US 2006/0042396 A1     Mar. 2, 2006

(51) Int. Cl.
    *G01H 1/00* (2006.01)
(52) U.S. Cl. .................. 73/587; 73/658; 73/602
(58) Field of Classification Search .......... 73/587, 73/590, 597, 598, 659; 702/35, 36, 39, 54, 702/188, 189, 196, 197
    See application file for complete search history.

(56) References Cited

U.S. PATENT DOCUMENTS

| | | | | |
|---|---|---|---|---|
| 3,713,127 A | * | 1/1973 | Keledy et al. | 340/540 |
| 3,822,586 A | * | 7/1974 | Pollock | 73/587 |
| 3,858,439 A | * | 1/1975 | Nakamura | 73/587 |
| 3,919,883 A | * | 11/1975 | Nakamura et al. | 73/587 |
| 3,924,456 A | * | 12/1975 | Vahaviolos | 73/770 |
| 3,956,731 A | * | 5/1976 | Lewis, Jr. | 340/945 |
| 4,006,625 A | * | 2/1977 | Davis | 73/587 |
| 4,107,981 A | * | 8/1978 | Kanagawa et al. | 73/801 |
| 4,448,062 A | * | 5/1984 | Peterson et al. | 73/86 |
| 4,806,292 A | * | 2/1989 | DeLacy | 264/40.1 |
| 4,922,754 A | * | 5/1990 | Horne et al. | 73/587 |
| 5,176,032 A | * | 1/1993 | Holroyd et al. | 73/587 |
| 5,195,046 A | | 3/1993 | Gerardi et al. | |
| 5,714,687 A | * | 2/1998 | Dunegan | 73/587 |
| 5,774,376 A | | 6/1998 | Manning | |

(Continued)

FOREIGN PATENT DOCUMENTS

DE          4237404          5/1994

(Continued)

OTHER PUBLICATIONS

Roh, Youn-Seo, et al., "*Effect of Impact Damage on Lamb Wave Propagation in Laminated Composites*" Department of Aeronautics and Astronautics, Stanford University, Stanford, CA 94305 (1995) pp. 1-12.

(Continued)

*Primary Examiner*—Helen C. Kwok
(74) *Attorney, Agent, or Firm*—MacPherson Kwok Chen & Heid LLP

(57) ABSTRACT

A method for both detecting and analyzing a change in the loading condition of a structure. A flexible substrate is employed, in which a distributed network of sensors is built. This substrate is either affixed to the surface of the structure, or built within it, so as to be able to detect propagating stress waves. After load change is detected, the resulting sensor signals are analyzed to determine the location, severity, and/or any characteristic frequencies of the load change. This information is then used to determine an appropriate response.

22 Claims, 5 Drawing Sheets

U.S. PATENT DOCUMENTS

| | | | |
|---|---|---|---|
| 6,006,163 | A | 12/1999 | Lichtenwalner et al. |
| 6,065,342 | A * | 5/2000 | Kerr et al. ............... 73/587 |
| 6,170,334 | B1 * | 1/2001 | Paulson ............... 73/587 |
| 6,252,334 | B1 | 6/2001 | Nye et al. |
| 6,370,964 | B1 * | 4/2002 | Chang et al. ............ 73/862.046 |
| 6,399,939 | B1 * | 6/2002 | Sundaresan et al. ...... 250/231.1 |
| 6,418,384 | B1 * | 7/2002 | Rothea et al. ............... 702/56 |
| 6,529,127 | B2 | 3/2003 | Townsend et al. |
| 6,691,007 | B2 | 2/2004 | Haugse et al. |
| 6,693,548 | B2 * | 2/2004 | Boyce et al. ............... 340/657 |
| 6,768,312 | B2 | 7/2004 | Sun et al. |
| 6,826,982 | B2 * | 12/2004 | O'Brien et al. ............... 73/587 |
| 7,038,470 | B1 | 5/2006 | Johnson |
| 7,075,424 | B1 | 7/2006 | Sundaresan et al. |
| 7,103,507 | B2 | 9/2006 | Gorinevsky et al. |
| 7,117,742 | B2 | 10/2006 | Kim |
| 7,118,990 | B1 | 10/2006 | Xu et al. |
| 2001/0047691 | A1 * | 12/2001 | Dzenis ............... 73/587 |
| 2004/0002815 | A1 | 1/2004 | Ishizaki et al. |
| 2004/0163478 | A1 | 8/2004 | Xu et al. |
| 2005/0072249 | A1 | 4/2005 | Maeda et al. |
| 2006/0079747 | A1 | 4/2006 | Beard et al. |
| 2006/0154398 | A1 | 7/2006 | Qing et al. |
| 2007/0018083 | A1 | 1/2007 | Kumar et al. |

FOREIGN PATENT DOCUMENTS

| | | |
|---|---|---|
| DE | 1983561 | 2/2000 |
| DE | 10217031 | 10/2003 |

OTHER PUBLICATIONS

Keilers, Charles Henry Jr., "*Damage identification in Composites Using Built-in Piezoelectrics: A Dissertation Submitted to the Department of Aeronautics and Astronautics and the Committee on Graduate Studies of Stanford University in Partial Fulfillment of the Requirements for the Degree of Doctor of Philosophy*", pp. 1-111 (Jun. 1993).

Chang, Fu-Kuo, "*Built-in Damage Diagnostics for Composite Structures*" Department of Aeronautics and Astronautics, Stanford University, Stanford, CA 94305 (1995).

Roh, Youn-Seo, "*Built-in Diagnostics for Identifying an Anomaly in Plates Using Wave Scattering*", UMI Microform 9924496, UMI Company, Ann Arbor, MI, (1999) pp. iv-88.

* cited by examiner

METHOD OF DETECTING AND ANALYZING CHANGES IN THE EXTERNAL LOADING CONDITIONS OF A STRUCTURE

BRIEF DESCRIPTION OF THE INVENTION

The present invention relates generally to structural health monitoring. More specifically, this invention relates to the detection and analysis of load changes upon a structure.

BACKGROUND OF THE INVENTION

The diagnostics and monitoring of structures, such as that carried out in the structural health monitoring field, are often accomplished by employing arrays of sensing elements. Such sensing elements, i.e., various types of sensors, actuators, and the like, detect and analyze the behavior and response of various structures. Accordingly, structures often must have a variety of sensing elements placed at various locations. Because individual sensing elements must often be placed separately, affixing a large array of such sensing elements can be tedious and time consuming. In addition, as each individual sensing element can require one or, commonly, multiple wires, large arrays of sensing elements can require a large number of individual wires, which may be difficult to handle and keep track of The securing of such large numbers of wires can often be painstaking and time consuming, as well. It is therefore desirable to package such sensing elements and their wires together in such a manner that the abovementioned difficulties are avoided, or at least reduced.

While the structural health monitoring field faces challenges in the placement of its own sensors, it is also challenged by an increased need to develop "smart" systems. Many current systems are capable of simply recording and processing information relating to the dynamic response of a structure. However, a growing need exists for systems that go beyond simple monitoring. Specifically, given the cost of many modern structures, as well as the increased maintenance and inspection costs associated with their growing complexity, a need exists for systems capable of not only detecting changes in external loading conditions, such as impacts and other events, but also quickly determining whether and where additional action must be taken as a result. For example, the quick determination of an impact's location, as well as what repairs may need to be taken, can reduce the time and expense taken in inspection. Accordingly, it is desirable not only to package sensors, but also to employ such sensor packages in the "smart" sensing of impacts.

SUMMARY OF THE INVENTION

Broadly speaking, the invention pertains to a method for detecting and analyzing a change in the loading condition of a structure. According to one embodiment, a flexible substrate is employed, in which a distributed network of sensors is built. This substrate is either affixed to the surface of the structure, or built within it, so as to be able to detect propagating stress waves. After load change is detected, the resulting sensor signals are analyzed to determine the location, severity, and/or any characteristic frequencies of the load change. This information can then be used to determine an appropriate response.

The invention can be implemented in numerous ways, including as a method, system, device, apparatus, or computer readable medium. Several embodiments of the invention are discussed below.

As a method of detecting and analyzing a change in the external loading condition of a structure, one embodiment of the present invention comprises receiving electrical signals from a plurality of sensors affixed to and spatially distributed on a flexible substrate attached to a structure. The sensors are configured to generate the electrical signals upon detection of propagating stress waves generated by a load change at a location of the structure, the propagating stress waves having frequencies corresponding to a severity of the load change. Those frequencies of the stress waves that fall within a range of frequencies are isolated, so as to facilitate detection of the load change. The electrical signals are then analyzed so as to determine the location of the load change, and processed so as to determine the severity of the load change.

As a method of detecting and analyzing a change in the external loading condition of a structure, one embodiment of the present invention comprises monitoring electrical signals emitted by a plurality of sensors affixed to and spatially distributed on a flexible substrate attached to a structure. The sensors are configured to generate the electrical signals upon detection of propagating stress waves generated by a load change at a location of the structure, the propagating stress waves having frequencies corresponding to a severity of the load change. Those frequencies of the stress waves that fall within a range of frequencies are then isolated. An occurrence of the load change is then determined, based upon the isolated frequencies of the stress waves. Upon the occurrence of the load change, the electrical signals are recorded and processed so as to determine a total strain energy detected at each of the positions along the structure. The location from each of the total strain energies and their respective positions along the structure are then calculated, and the recorded electrical signals are analyzed so as to determine the severity of the load change.

As a computer readable memory to direct a computer to function in a specified manner, one embodiment of the invention comprises a number of modules. A first module is configured to monitor electrical signals emitted by a plurality of sensors affixed to and spatially distributed on a flexible substrate attached to a structure, the sensors configured to generate the electrical signals upon detection of propagating stress waves generated by a load change at a location of the structure, the propagating stress waves having frequencies corresponding to a severity of the load change. A second module is configured to determine, according to isolated ones of the frequencies that fall within a range of frequencies, an occurrence of the load change. A third module is configured to record the electrical signals upon the occurrence of the load change. A fourth module is configured to process the recorded electrical signals so as to determine a total strain energy detected at each of the positions along the structure. A fifth module is configured to calculate the location from each of the total strain energies and their respective positions along the structure, and a sixth module is configured to analyze the recorded electrical signals so as to determine the severity of the load change.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention, together with further objects and advantages thereof, may best be understood by reference to the following description taken in conjunction with the accompanying drawings in which.

Like reference numerals refer to corresponding parts throughout the drawings. Also, it is understood that the depictions in the figures are diagrammatic and not to scale.

DETAILED DESCRIPTION OF THE PREFERRED EMBODIMENTS

In one embodiment of the invention, a flexible layer with sensors distributed thereon is attached on or within a structure. As the sensors are distributed across the flexible layer, the layer effectively creates a network of sensors that are spread across various sites on the structure. When the sensors detect a change in the external loading condition of the structure, their resulting electrical signals are analyzed to determine various characteristics of the change. For example, because the sensors are spread out along various locations on the structure, they will each experience different stress waves, at different times. Analysis of the characteristics of each can reveal the location and severity of the change in load condition. Similarly, if the sensor signals are filtered to screen out various frequencies, the sensors are effectively tuned to ignore certain types of changes, such as impacts that are known to be of no concern. Accordingly, different responses can be initiated based on the location, severity, and certain frequencies generated by the change in load condition.

Embodiments of the invention can thus allow for "smart" sensor networks that are capable of discriminating between different types of changes in load condition, thus allowing users to selectively ignore changes that are known to be of little concern, and to react more quickly to those that are of greater concern. Additionally, because the sensor network is built into a unitary structure (the flexible layer), the sensor network can be easier to install and maintain.

Figure 1A:
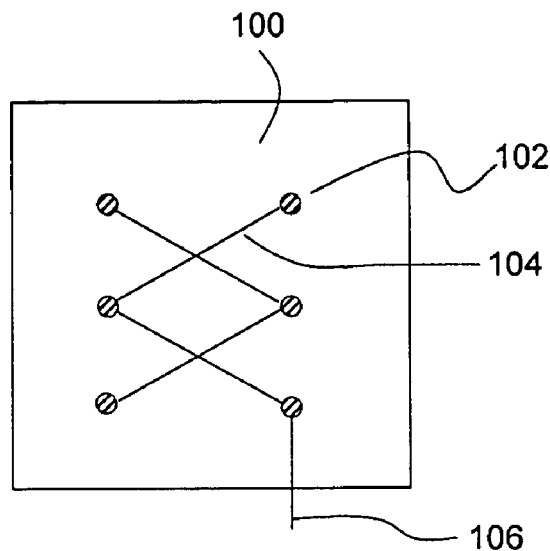
FIG. 1A illustrates a top view of a sensing layer manufactured in accordance with embodiments of the present invention.

FIG. 1A illustrates one such flexible sensing layer for use in accordance with embodiments of the present invention. A diagnostic layer 100 is shown, which contains an array of sensors 102. The sensors 102 can be sensors capable of receiving signals used in structural health monitoring such as stress waves, and are connected to conductive traces 104. The traces 104 connect (or interconnect, if necessary) sensors 102 to one or more output leads 106 configured for connection to a processor or other device capable of analyzing the data derived from the sensors 102.

Figure 1B:
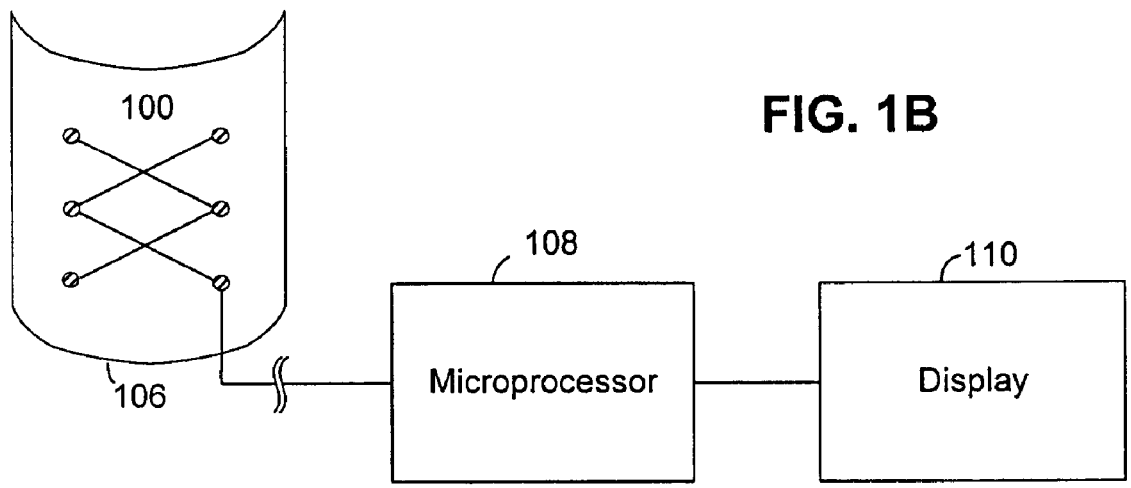
FIGS. 1B-1C illustrate block and circuit diagrams, respectively, describing elements of a sensing layer and their operation.

The diagnostic layer 100 and its operation are further described in U.S. Pat. No. 6,370,964 to Chang et al., which is hereby incorporated by reference in its entirety and for all purposes. Construction of the diagnostic layer 100 is also explained in U.S. patent application Ser. No. 10/873,548, filed on Jun. 21, 2004, which is also incorporated by reference in its entirety and for all purposes. It should be noted that the present invention is not limited to the embodiments disclosed in the aforementioned U.S. patent application Ser. No. 10/873,548, but instead encompasses the use of flexible sensor layers having any configuration. For illustration, FIG. 1B further describes aspects of the operation of the diagnostic layer 100. In operation, the output leads 106 are electrically connected to an analysis unit such as a microprocessor 108, suitable for analyzing signals from the sensors 102. In certain embodiments, the flexible layer 100 is first attached to a structure in a manner that allows the sensing elements 102 to detect quantities related to the health of the structure. For instance, the sensors 102 can be sensors configured to detect stress waves propagated within the structure, and emit electrical signals accordingly. The microprocessor 108 then analyzes these electrical signals according to known structural health monitoring methods, to assess various aspects of the health of the structure. For instance, detected stress waves can be analyzed to detect crack propagation within the structure, delamination within composite structures, or the likelihood of fatigue-related failure. Quantities such as these can then be displayed to the user via display 110.

Figure 1C:
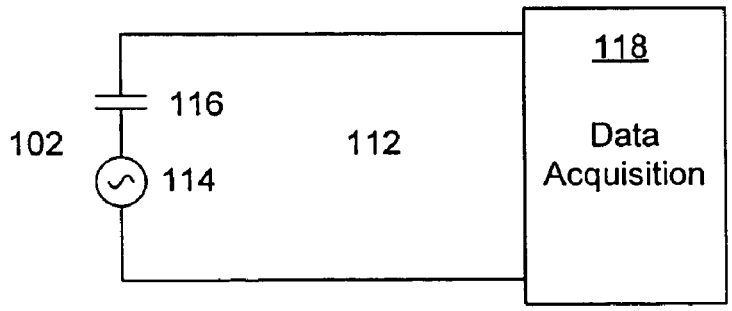

In one embodiment, the sensors 102 can be piezoelectric transducers capable of reacting to a propagating stress wave by generating a voltage signal. Analysis of these signals highlights properties of the stress wave, such as its magnitude, propagation speed, frequency components, and the like. Such properties are known to be useful in structural health monitoring. FIG. 1C illustrates a circuit diagram representation of such an embodiment. This embodiment can often be represented as a circuit 112, where each sensor 102 is represented as a voltage source 114 in series with a capacitor 116 (impedance circuitry) used to adjust signal strength. This pair is in electrical contact with a data acquisition unit 118, such as a known data acquisition card employed by microprocessors 108 (the data acquisition unit 118 can be thought of as a component interface to the microprocessor 108). Propagating stress waves induce the sensor 102 to emit a voltage signal that is recorded by the data acquisition unit 118, where it can be analyzed to determine the health of the structure in question.

Figure 2A:
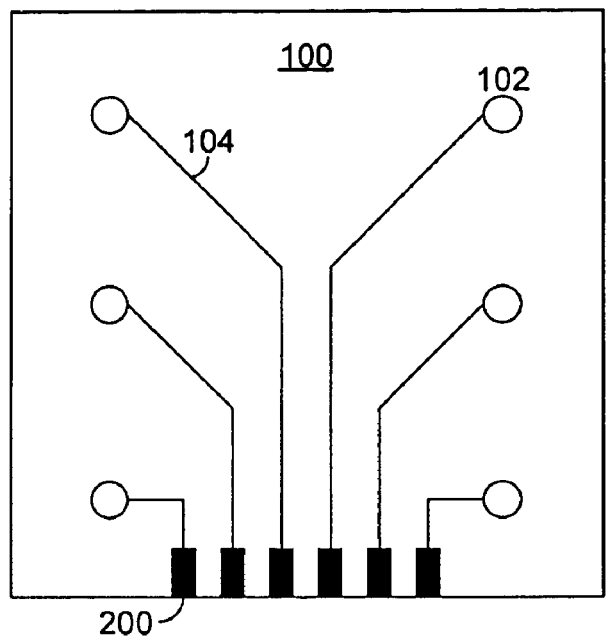
FIG. 2A illustrates a top view highlighting further details of a sensing layer having a two-dimensional array of sensors.
Figure 2B:
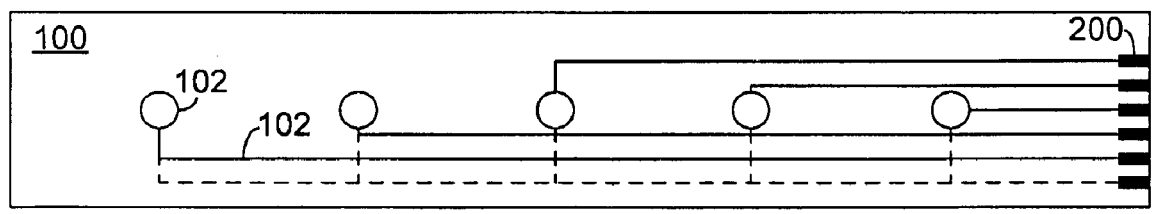
FIG. 2B illustrates a top view highlighting further details of a sensing layer having a one-dimensional array of sensors.

FIG. 2A illustrates further details of a sensing layer 100. It should be noted that the invention includes sensing layers 100 configured in any number of ways. For instance, the sensors 102 can be distributed in any manner throughout the layer 100. Here, six such sensors 102 are shown regularly distributed in a two-dimensional array, each with a single trace 104 extending to the contacts 200. However, one of skill will observe that the sensors 102, traces 104, and contacts 200 can be distributed in any manner, and in any number, without departing from the scope of the invention. For example, the sensors 102 can also be configured in a one-dimensional array such as that shown in FIG. 2B. Here, instead of two rows of sensors 102, a single row is employed. Such a one-dimensional array finds uses in, for example, the monitoring of areas too narrow to fit a two-dimensional array.

Figure 3A:
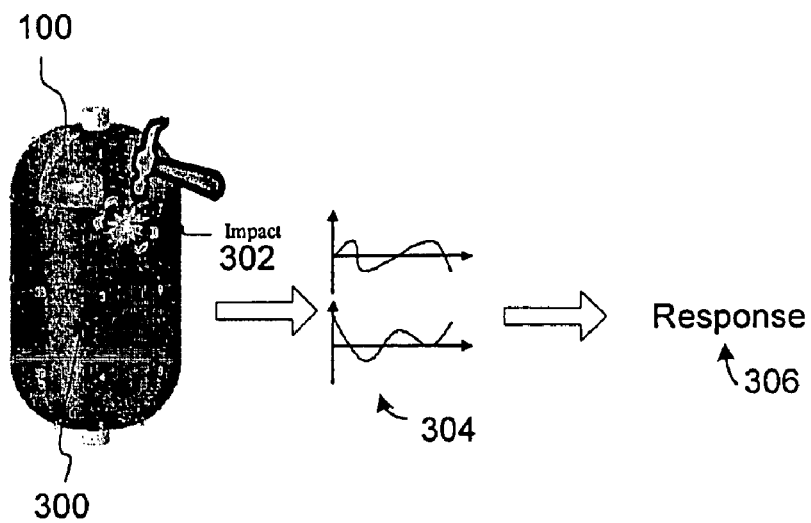
FIGS. 3A-3B illustrate a graphical representation and a flow diagram, respectively, that depict an overview of process steps taken in accordance with embodiments of the present invention.

FIG. 3A offers a graphical representation of detection and analysis processes undertaken by embodiments of the invention. One or more diagnostic layers 100 are attached to a structure 300 at various positions. Here, a one-dimensional array of sensors is attached to a pressure vessel. For purposes of illustration, the layers 100 are shown attached to the exterior of the pressure vessel, but the invention contemplates embodiments in which the layers 100 are affixed to the structure 300 in any manner that allows the sensors 102 to detect propagating stress waves. For example, the layers 100 can be located on the interior of the vessel or, in the case of composite pressure vessels, embedded within the layers of the vessel itself When a change in external loading condition occurs at a location 302, such as by an impact with a foreign object, the sensors 102 within the layers 100 detect the resulting stress waves and generate electrical signals 304 accordingly. Analysis of these electrical signals dictates an appropriate response 306.

Figure 3B:
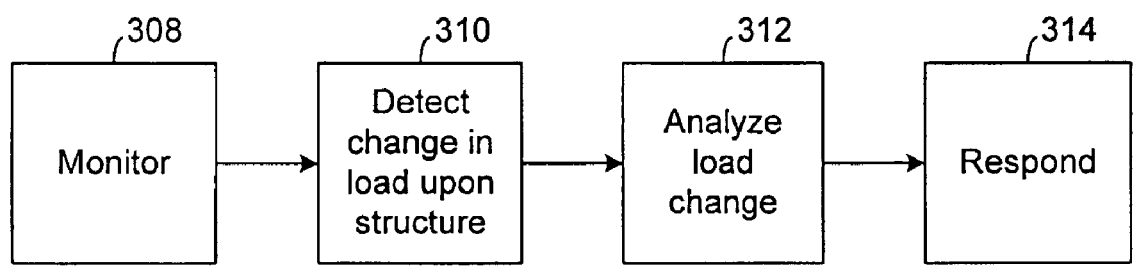

FIG. 3B illustrates the operations associated with the load change detection and analysis process of FIG. 3A, in the form of a flow diagram. Once the layers 100 are properly attached, the sensors 102 can monitor any change in the external loading condition of the structure 300 (step 308). When these sensors 102 detect a change in external loading condition (step 310), they generate electrical signals 304, which are analyzed (step 312) to determine various characteristics of the change. Based upon these characteristics, an appropriate response is determined (step 314).

Figure 4:
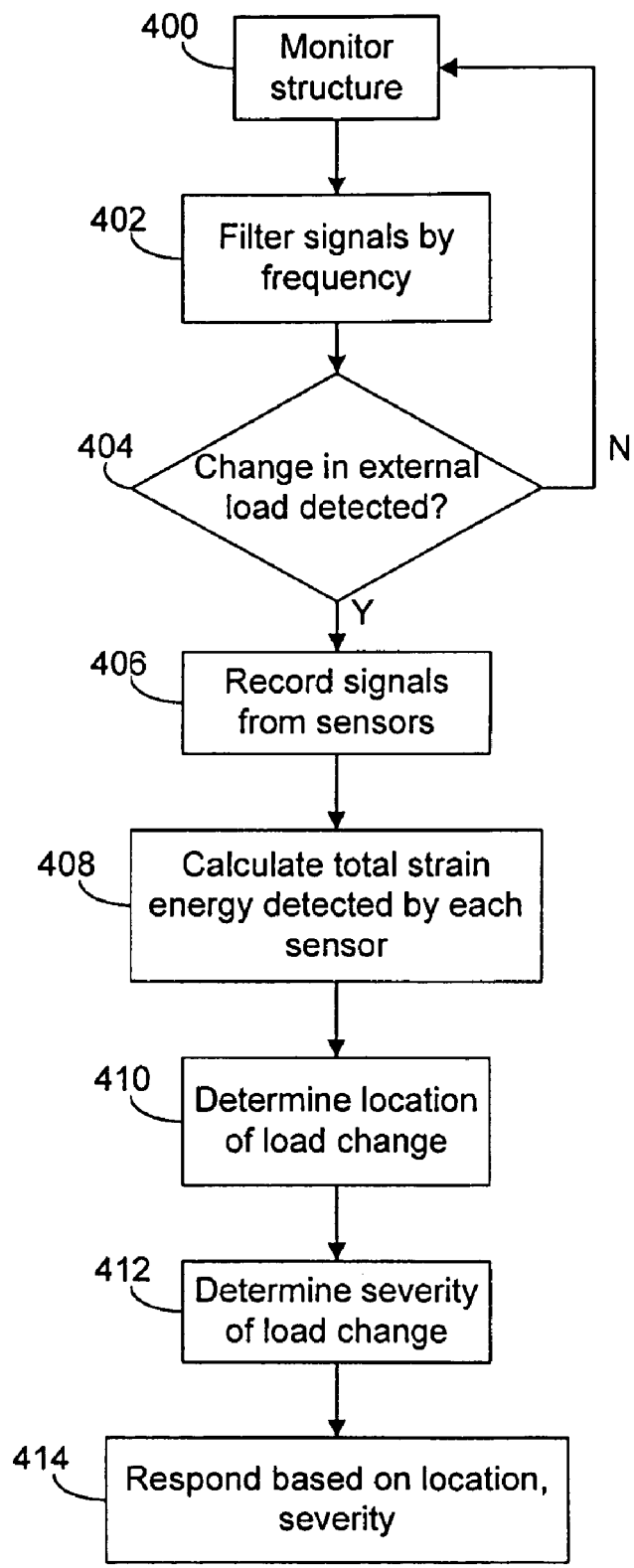
FIG. 4 is a flow diagram illustrating further details of process steps taken in accordance with embodiments of the present invention.

FIGS. 3A-3B explain process operations of the invention at a rather high level, both for ease of understanding, and to illustrate the fact that the invention encompasses the carrying out of each step in different ways. Some of these different ways are explained with reference to FIG. 4, which is a flow diagram illustrating further details of the process operations shown in FIGS. 3A-3B.

Sensor layers 100 are attached to a structure 300 in appropriate sites along the structure, in essence forming a spatially distributed network of sensors along the body of the structure itself. Techniques for appropriately locating and attaching the layers 100 can encompass such factors as the dynamic performance of the structure 300 at particular locations, environmental conditions, and the like. Once the sensor layers 100 and sensors 102 are properly attached to the structure 300, the sensors are employed to monitor the structure 300 for propagating stress waves within (step 400). In many embodiments, the sensors 102 convert detected stress waves to electrical signals. The stress waves, and the resulting electrical signals, comprise a spectrum of component frequencies. As different load conditions generate different such spectra, the frequencies are filtered to isolate those that represent certain types of load conditions, and to attenuate those that do not (step 402). Upon detection of an impact or other such load condition that generates filtered frequencies that are of concern (step 404), the resulting electrical signals are recorded (step 406) and analyzed to determine the total strain energy detected by each sensor (step 408). In connection with this step, it is sometimes advantageous to convert the analog sensor signals to a digital signal, for ease of recording and analysis. Accordingly, the invention encompasses embodiments in which known analog to digital (A/D) conversion circuitry is employed, either on the layer 100, on the structure 300, or remote, to convert the sensor 102 output to a digital signal. From these strain energies and/or other information, the location of the load change is determined (step 410), as is its severity (step 412). The frequencies, location, and severity of the loading condition change are then examined to determine an appropriate response (step 414).

The process steps of embodiments of the invention having been explained, attention now turns to a more detailed description of some of the steps listed above. First, as previously described, signals from the sensors 102 are filtered by frequency. It is known that different load conditions, in general, can generate different spectra of stress waves. For instance, a collision with a soft, flexible object will tend to generate lower-frequency stress waves than a collision with a hard metal object. Thus, if one is concerned only with impacts by hard objects, a high-pass filter can be employed to attenuate low frequency sensor signals. Conversely, if one wishes to detect and analyze impacts by softer objects, a low-pass filter may be employed to attenuate high frequency sensor signals.

As one example, airplane operators may be greatly concerned by collisions with metallic objects, which can easily cause severe damage to an airplane's rather fragile structure. However, they may be less concerned by collisions with soft objects such as birds, which tend not to do as much damage to the structure of the airplane. Accordingly, one or more high pass filters can be employed to attenuate the low frequency stress waves caused by impacts with organic objects. In this manner, impacts that are of less worry are essentially filtered out, thus isolating frequencies from only those impacts that are of potential concern.

Figure 5A:
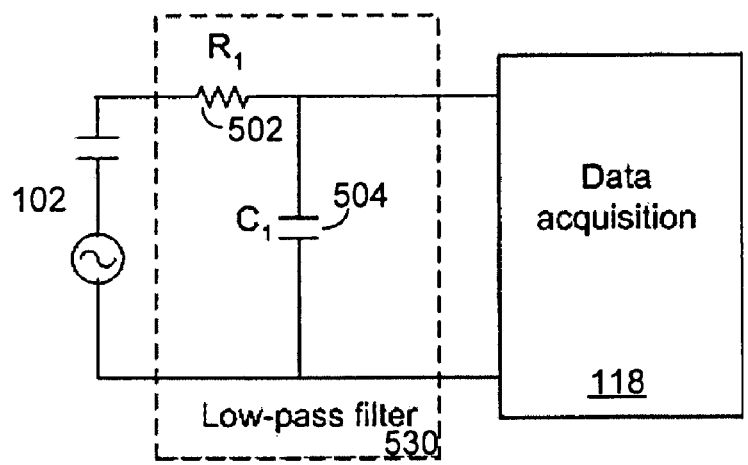
FIGS. 5A-5C illustrate additional circuit elements employed to filter sensor output frequencies in accordance with embodiments of the present invention.
Figure 5B:
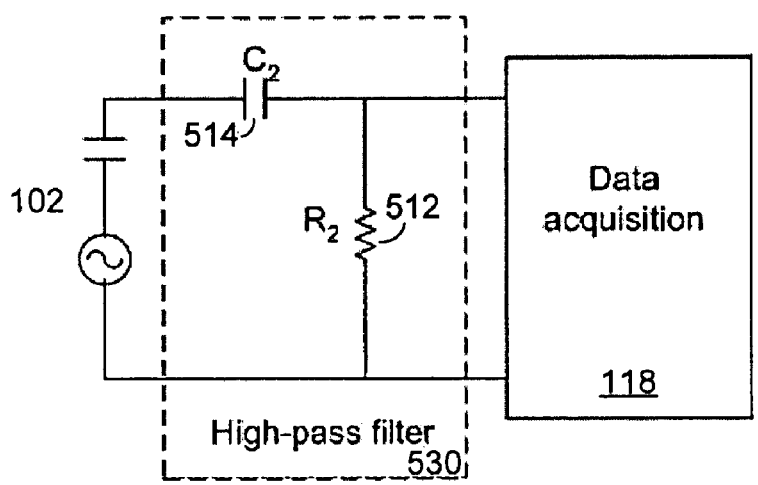
Figure 5C:
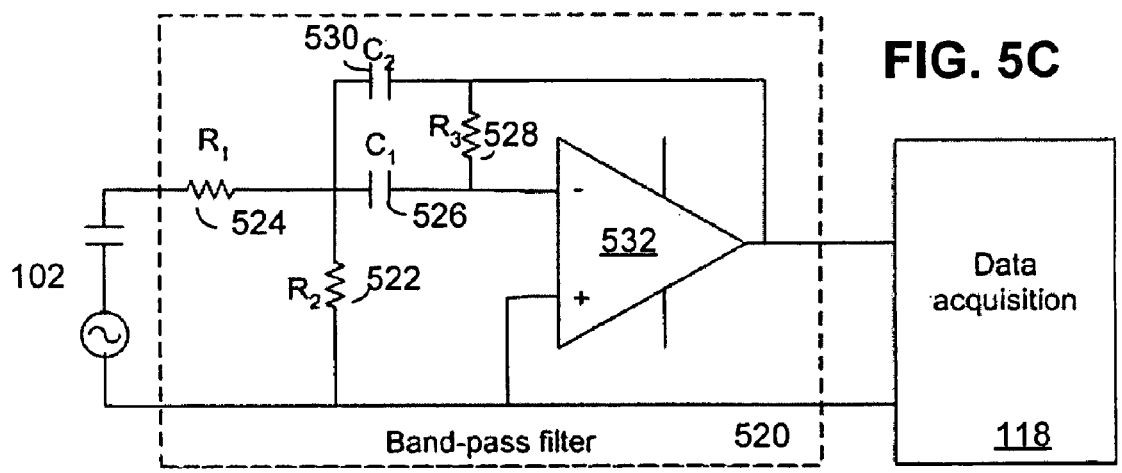

FIGS. 5A-5C illustrate additional circuit elements employed to filter sensor output frequencies in accordance with the above. In FIG. 5A, a low-pass filter 500 is placed within the circuit 112 to filter out high sensor frequencies. In the embodiment shown, a resistor 502 is placed in series with the sensor 102, and a capacitor 504 is placed in parallel with the sensor 102 and resistor 502. In known fashion, the resistance and capacitance values $R_1$ and $C_1$ can be chosen so as to pass whatever lower frequencies are of interest. This may be suitable in applications where, for example, it is desirable to selectively detect and react to collisions with animals or people.

In FIG. 5B, a high-pass filter 510 is employed to filter out low sensor signal frequencies. In the embodiment shown, a capacitor 514 is placed in series with the sensor 102, and a resistor 512 is placed in parallel with both of these. Values of C2 and R2 are then chosen so as to pass whatever higher frequencies are of interest, and to attenuate lower frequencies. In embodiments such as the above mentioned airplane example, a high-pass filter 500 can be employed to attenuate those frequencies caused by collisions with softer objects, and to pass those frequencies caused by collisions with harder objects. In this manner, the high-pass filter 500 can attenuate irrelevant frequencies, and isolate those that are more indicative of an impact of concern. The characteristic spectra of both types of collisions can be determined in any manner, such as empirically or by simulation, and values of $R_2$ and $C_2$ can then be set appropriately.

In FIG. 5C, a band-pass filter 520 is employed to pass frequencies in a specified band or range. In this embodiment, resistors and capacitors 522-530 are placed in electrical communication with an operational amplifier 532 and the sensor 102 in known fashion such as that shown. Such a band-pass filter 520 may be suitable for use in applications where collisions with bodies of specific hardness are of interest, or to simultaneously screen out both noise and low-frequency effects.

It should be noted that, in operation, the filters 500, 510, 520 can be any circuit or collection of circuit elements, and not just the resistor-capacitor pairs or active configuration shown. It should also be noted that the filters 500, 510, 520 can be located anywhere, such as within a housing of the microprocessor 108, on the structure 300, or on the layer 100 such as described in the incorporated U.S. patent application Ser. No. 10/873,548.

Another step to be explained in further detail is the load-change detection step 404. In general, the sensors 102 can detect load changes in many different ways, any and all of which are contemplated by the invention. For example, the output voltage of each sensor 102 can be monitored, and the microprocessor 108 can be programmed to recognize the presence of a load change when the output voltage of any sensor, or any collection of sensors, exceeds a certain limit, signaling a collision of at least a certain minimum severity. Similarly, a load change can be recognized upon detection of signals of a certain characteristic frequency, or minimum duration in which they exceed a certain minimum magnitude. Each of these methods is contemplated by the invention, which simply discloses the detection of load changes using any approach.

Yet another step to be explained in further detail is the determination of a load change's location 302, i.e., steps 408-410. As with detection, layers 100 can be employed to determine location in any number of ways, each of which is contemplated by the invention. For instance, a load change at a particular location 302 will generate stress waves that propagate outward from that site and along the surface of the object 300. Those sensors 102 located closer to the load change location 302 will detect these stress waves first, while those farther from the location 302 will detect them later. Consequently, the time at which each sensor 102 first detects the stress wave (or first detects some characteristic portion of the stress wave) can be used to determine that the load change occurred closer to certain sensors 102 than others. From this information, it is known that the location 302 can be determined.

The total strain energy detected by each sensor 102 can also be used to determine the load change location 302. More specifically, it is known that the total strain energy detected by a sensor 102 is the integrated sum of the square of the output voltage generated. In other words, for a time-dependent output voltage signal s(t) generated by a particular sensor 102, the total strain energy detected by that sensor 102, up to time t, is:

$$\int_0^t |s(t)|^2 \, dt$$

As stress waves tend to be dispersive, an analysis of the total strain energy detected by each sensor will indicate which sensors the load change occurred closer to, and which sensors the load change occurred farther from. For example, it is likely that, for any given load change, the sensor 102 having the highest detected total strain energy will be nearest the location 302, the second-highest will be second-nearest, etc. From this information, it is known that a location 302 can be determined.

Once the location 302 is determined, the next step 410 involves a determination of the severity of the load change. In the embodiments of the invention, the severity of a load change can be defined and/or measured in any number of ways, each of which is contemplated by the invention. "Severity" can be defined as impact force, total energy transferred, or as any other quantity/quantities that can be used in structural health monitoring.

After a load change upon a structure 300, it is known that many properties of the resulting stress waves are dependent on the material and geometry of both the impacting body and the structure 300. For example, the speed at which the waves propagate is partially a function of the material of the structure 300 and properties such as its stiffness. Similarly, the magnitude of the stress waves is partially dependent upon the local thickness of the structure 300. Any relation between the stress waves detected and the severity of the load change is specific to the properties (such as material and geometry) of the structure 300. Accordingly, the invention includes the determination of a relation between stress waves detected and load change severity implied, by any method. As one example, by experimental testing, it may be determined that stress waves of a certain magnitude, detected at particular locations (i.e., sensor 102 sites), imply a load change of a certain severity upon a specific structure 300. As another example, theoretical calculations or numerical simulations can be used to obtain a relation between the location of the load change, the total strain energy detected at particular sites close to that location, and the severity of the load change (which can be defined in many different ways). It has been shown that such methods are capable of estimating severity to within 25% accuracy.

Once a load change is detected at a particular location, with a particular severity, and generating stress waves in certain frequency ranges, a response can be generated, as in step 412. The invention contemplates that this response can take on any form, from a simple warning to shutdown, actuation of impact mitigation devices, triggered repairs, and/or anything in-between.

Advantageously, the information determined by the methods of the invention (including, as above, location, severity, and frequency information) can be used to discriminate between different types of load changes, and to react accordingly. Thus, the invention allows users of the structure 300 to selectively ignore those load changes that are of no concern, as opposed to prior instances that would have required inspection upon every load change detected. As one illustration, consider again the airplane example given previously. Clearly, a collision with a bird or other flying animal is of less concern from a structural standpoint than a collision with a solid or metallic object of the same size. The sensor layer 100 can thus include high-pass filters 510. Also, a collision upon certain surfaces of the aircraft, such as the wings, may potentially be more dangerous than an impact along the fuselage. Sensors can thus be placed along the surfaces of the aircraft at various sites, and the entire structure can then be monitored for impact.

Due to the presence of high-pass filters 510, stress waves generated by collisions with birds can often be ignored, and will thus likely be filtered out. However, collisions with solid objects above a certain size will generate higher frequency stress waves of sufficient magnitude to trigger the detection of an impact. The sensors convert their detected stress waves to electrical signals, which are then recorded and analyzed to determine the total strain energy detected by each sensor 102. The location and severity of the impact are determined as above, and based on this information, a "smart" response can be given. For example, if a smaller collision is detected upon an area of the fuselage not close to any critical systems or components, no action is taken. However, if the sensors 102 detect a collision on a leading edge of a wing that is of sufficient severity to have potentially damaged the wing, an alert may be initiated, such as a visual warning projected on the display 110.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed.

Many modifications and variations are possible in view of the above teachings. For example, it has already been noted that the invention encompasses the detection of load changes according to many different methods, such as by analysis of signal magnitude, duration, or the like. Similarly, the invention encompasses the determination of load change location by any method, such as a time-based analysis of the signals, or a determination of total strain energies. Also, load change severity can be defined in any appropriate manner, and can be determined from detected stress waves by any method, be it theoretical or experimental. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A method of detecting and analyzing a change in an external loading condition of a structure, comprising:
   receiving electrical signals from a plurality of sensors affixed to and spatially distributed on a flexible substrate attached to a structure, the sensors configured to generate the electrical signals upon detection of propagating stress waves generated by a load change at a location of the structure, the propagating stress waves having frequencies corresponding to a severity of the load change;
   isolating frequencies of the received electrical signals that fall within a range of frequencies characteristic of an impact of concern, so as to facilitate detection of the load change;
   analyzing the isolated frequencies of the electrical signals so as to determine the location of the load change; and
   processing the isolated frequencies of the electrical signals so as to determine the severity of the load changes;
   wherein the analyzing further comprises calculating a total strain energy detected at each of the positions alone the structure, and determining the location of the load change from each of the total strain energies and associated ones of the positions along the structure.

2. The method of claim 1 further comprising initiating a response to the load change based upon the isolated frequencies, the location of the load change, and the severity of the load change.

3. The method of claim 1 wherein the flexible substrate is attached to the structure so as to spatially distribute the sensors in an array, the array of sensors configured to detect propagating stress waves at various positions along the structure.

4. The method of claim 3 wherein the sensors are piezoelectric sensors.

5. The method of claim 3 wherein the analyzing further comprises, for each of the sensors, recording times at which the propagating stress waves are detected, and determining the location from the times at which the propagating stress waves are detected by each of the sensors, and associated ones of the positions of each of the sensors.

6. The method of claim 1 wherein the isolating further comprises filtering the electrical signals by engaging a low pass filter affixed to the flexible substrate, the low pass filter being configured to pass low frequencies of the electrical signals and to attenuate higher frequencies of the electrical signals, so as to isolate frequencies of the load change that are among the lower frequencies.

7. The method of claim 6 wherein the engaging further comprises engaging ones of a plurality of low pass filters each affixed to the flexible substrate, wherein each of the sensors is electrically connected to a separate low pass filter of the plurality of low pass filters, and wherein each low pass filter of the plurality of low pass filters comprises a resistor in electrical series with an associated sensor, and a capacitor in electrical parallel with an associated sensor and associated resistor.

8. The method of claim 1 wherein the isolating further comprises filtering the electrical signals by engaging a high pass filter affixed to the flexible substrate, the high pass filter being configured to pass high frequencies of the electrical signals and to attenuate lower frequencies of the electrical signals, so as to isolate frequencies of the load change that are among the higher frequencies.

9. The method of claim 8 wherein the engaging further comprises engaging ones of a plurality of high pass filters each affixed to the flexible substrate, wherein each of the sensors is electrically connected to a separate high pass filter of the plurality of high pass filters, and wherein each high pass filter of the plurality of high pass filters comprises a capacitor in electrical series with an associated sensor, and a resistor in electrical parallel with an associated sensor and associated capacitor.

10. The method of claim 1 wherein the isolating further comprises filtering the electrical signals by engaging a band pass filter configured to pass band frequencies of the electrical signals and to attenuate both frequencies of the electrical signals that are higher than the band frequencies, and frequencies of the electrical signals that are lower than the band frequencies, so as to isolate frequencies of the load change that are among the band frequencies.

11. A method of detecting and analyzing a change in an external loading condition of a structure, comprising:
    monitoring electrical signals emitted by a plurality of sensors affixed to and spatially distributed on a flexible substrate attached to a structure so as to monitor positions along the structure, the sensors configured to generate the electrical signals upon detection of propagating stress waves generated by a load change at a location of the structure, the propagating stress waves having frequencies corresponding to a severity of the load change;
    isolating frequencies of the received electrical signals that fall within a range of frequencies;
    determining an occurrence of the load change based upon the isolated frequencies of the received electrical signals;
    upon the occurrence of the load change, recording the received electrical signals so as to form recorded electrical signals;
    processing the recorded electrical signals so as to determine a total strain energy detected at each of the positions along the structure;
    calculating the location from each of the total strain energies and associated ones of the positions along the structure; and
    analyzing the recorded electrical signals so as to determine the severity of the load change.

12. The method of claim 11 further comprising responding to the load change according to the calculated location of the load change and the severity of the load change.

13. The method of claim 11 wherein the flexible substrate is attached to the structure so as to spatially distribute the sensors in an array, wherein the recording further comprises recording electrical signals corresponding to the propagating stress waves detected at various ones of the positions along the structure.

14. The method of claim 13 wherein the sensors are piezoelectric sensors.

15. The method of claim 11 wherein the isolating further comprises filtering the electrical signals by engaging a low pass filter affixed to the flexible substrate, the low pass filter being configured to pass lower frequencies of the electrical signals and to attenuate higher frequencies of the electrical signals, so as to isolate frequencies of the load change that are among the lower frequencies.

16. The method of claim 15 wherein the engaging further comprises engaging ones of a plurality of low pass filters each affixed to the flexible substrate, wherein each of the sensors is electrically connected to a separate low pass filter of the plurality of low pass filters, and wherein each low pass filter of the plurality of low pass filters comprises a resistor in electrical series with an associated sensor, and a capacitor in electrical parallel with an associated sensor and associated resistor.

17. The method of claim 11 wherein the isolating further comprises filtering the electrical signals by engaging a high pass filter affixed to the flexible substrate, the high pass filter being configured to pass higher frequencies of the electrical signals and to attenuate lower frequencies of the electrical signals, so as to isolate frequencies of the load change that are among the higher frequencies.

18. The method of claim 17 wherein the engaging further comprises engaging ones of a plurality of high pass filters each affixed to the flexible substrate, wherein each of the sensors is electrically connected to a separate high pass filter of the plurality of high pass filters, and wherein each high pass filter of the plurality of high pass filters comprises a capacitor in electrical series with an associated sensor, and a resistor in electrical parallel with an associated sensor and associated capacitor.

19. The method of claim 11 wherein the isolating further comprises filtering the electrical signals by engaging a band pass filter affixed to the flexible substrate, the band pass filter being configured to pass band frequencies of the electrical signals and to attenuate both frequencies of the electrical signals that are higher than the band frequencies, and frequencies of the electrical signals that are lower than the band frequencies, so as to isolate frequencies of the load change that are among the band frequencies.

20. A computer readable memory to direct a computer to function in a specified manner, comprising:
- a first module to monitor electrical signals emitted by a plurality of sensors affixed to and spatially distributed on a flexible substrate attached to a structure so as to monitor positions along the structure, the sensors configured to generate the electrical signals upon detection of propagating stress waves generated by a load change at a location of the structure, the propagating stress waves having frequencies corresponding to a severity of the load change;
- a second module to determine, according to isolated ones of the frequencies that fall within a range of frequencies, an occurrence of the load change;
- a third module to record the electrical signals upon the occurrence of the load change;
- a fourth module to process the recorded electrical signals so as to determine a total strain energy detected at each of the positions along the structure;
- a fifth module to calculate the location from each total strain energy and associated ones of the positions along the structure; and
- a sixth module to analyze the recorded electrical signals so as to determine the severity of the load change.

21. The computer readable memory of claim 20 further comprising a seventh module to respond to the load change according to the calculated location of the load change and the severity of the load change.

22. The computer readable memory of claim 20 further comprising a seventh module to filter the electrical signals so as to isolate frequencies of the load change that fall within the range of frequencies.

* * * * *